US010817892B2

(12) United States Patent
Walsh et al.

(10) Patent No.: US 10,817,892 B2
(45) Date of Patent: Oct. 27, 2020

(54) DIGITAL COUPON OFFER REDEMPTION

(71) Applicant: QUOTIENT TECHNOLOGY INC., Mountain View, CA (US)

(72) Inventors: Michael Walsh, San Francisco, CA (US); William Robert Fisher, Palo Alto, CA (US); Kavita Aggarwal, Mountain View, CA (US)

(73) Assignee: Quotient Technology Inc., Mountain View, CA (US)

( * ) Notice: Subject to any disclaimer, the term of this patent is extended or adjusted under 35 U.S.C. 154(b) by 1171 days.

(21) Appl. No.: 14/851,502

(22) Filed: Sep. 11, 2015

(65) Prior Publication Data

US 2016/0148241 A1 May 26, 2016

Related U.S. Application Data

(60) Provisional application No. 62/083,061, filed on Nov. 21, 2014.

(51) Int. Cl.
*G06Q 30/02* (2012.01)

(52) U.S. Cl.
CPC ..... *G06Q 30/0225* (2013.01); *G06Q 30/0238* (2013.01)

(58) Field of Classification Search
CPC .............. G06Q 30/0207; G06Q 20/387; G06Q 30/0225; G06Q 30/0238
See application file for complete search history.

(56) References Cited

U.S. PATENT DOCUMENTS

| 2007/0162341 A1* | 7/2007 | McConnell | G06Q 30/02 705/14.38 |
| 2010/0121697 A1* | 5/2010 | Lin | G06Q 20/322 705/14.14 |
| 2011/0251910 A1* | 10/2011 | Dimmick | G06Q 20/12 705/17 |
| 2012/0136706 A1* | 5/2012 | Chang | G06Q 30/0219 705/14.21 |

(Continued)

OTHER PUBLICATIONS

Mobeam and ProLogic partner to enable digital coupons on mobile devices. Business Wire. (Aug. 24, 2012) [retrieved on Jul. 24, 2020] Retrieved from: Dialog. <URL: https://dialog.proquest.com/professional/docview/1072684082?accountid=131444>. (Year: 2012).*

*Primary Examiner* — Abhishek Vyas
*Assistant Examiner* — Monica A Mandel
(74) *Attorney, Agent, or Firm* — Hickman Palermo Becker Bingham LLP

(57) ABSTRACT

A coupon clearinghouse server receives a request for a coupon offer from a client device. The server transmits only a first subset of coupon offer data for the coupon offer to the client device, and stores, in memory, a first code for a first merchant at which the coupon offer is redeemable. The code is not revealed to the client device. Subsequently, the server receives, from the client device, a second code that the client device has obtained at a point of sale system. The server determines if there is a match between the first code and the second code, and if so, transmits the second subset of coupon offer data including coupon offer redemption instructions to the client device. The client device presents the now complete coupon offer to the point of sale system to redeem the coupon offer.

18 Claims, 7 Drawing Sheets

(56) References Cited

U.S. PATENT DOCUMENTS

| | | | | |
|---|---|---|---|---|
| 2012/0284192 A1* | 11/2012 | Yilmaz | ................ | H04L 9/0825 |
| | | | | 705/50 |
| 2014/0081722 A1* | 3/2014 | Schacht | ............. | G06Q 30/0207 |
| | | | | 705/14.15 |
| 2015/0379552 A1* | 12/2015 | Kent | ................. | G06Q 20/3276 |
| | | | | 705/14.38 |

* cited by examiner

DIGITAL COUPON OFFER REDEMPTION

CROSS-REFERENCE TO RELATED APPLICATIONS; BENEFIT CLAIM

This application claims the benefit of U.S. Provisional Application No. 62/083,061, filed Nov. 21, 2014, the entire contents of which is hereby incorporated by reference as if fully set forth herein, under 35 U.S.C. § 119(e).

TECHNICAL FIELD

Embodiments relate generally to the generation, processing, storage, management, usage, distribution and/or delivery of digital offers, including digital coupons and other digital promotional vehicles.

BACKGROUND

Approaches described in this Background section may include approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Targeted marketing techniques assist a variety of entities, such as product manufacturers, service providers, and retailers, in efficiently persuading consumers to purchase certain products and service. A marketing entity may include, without limitation, product manufacturers, service providers, retailers, third-party marketing firms acting on behalf of another entity, non-profit organizations, and so forth. The marketing entity may identify characteristics of people to which the entity wishes to "market" a product or service. For example, an entity that sells product X may determine that it wants to market to persons that have purchased a complimentary product Y within a timeframe of Z. Of course, one problem with targeted marketing is that it is sometimes difficult to ascertain exactly what characteristics to target.

Once targeted characteristics have been identified, the entity may then attempt to "market" to persons who have those characteristics. Unfortunately, it is also generally difficult to ascertain whether a given person actually has the targeted characteristics and/or how to actually reach specific persons that have those specific characteristics. For example, a particular retailer may have no idea that a potential consumer recently purchased product Y from another store, and thus be unable to specifically target marketing for Product X to that potential consumer. Large-scale targeted marketing is therefore typically difficult to achieve with a high degree of efficiency. Rather, a marketing entity is typically limited to less efficient targeting techniques, such as targeting specific zip codes or web sites, thus resulting in the marketing entity wasting marketing resources on many persons who do not have the targeted characteristics.

One common marketing technique involves incentivizing costumer behavior through targeted promotional offers. An "offer" may be construed to be a promise by an offer provider, which may be any entity engaged in targeted marketing, to provide a consumer with a benefit under a certain set of implicit or explicit conditions known as terms. Example benefits include, without limitation, a monetary gift, a discount applied to the purchase of one or more products or services, free products and/or services, access to additional offers, and so forth. Example terms may include any one or more of, without limitation, actions that the consumer must perform, a specific set of item(s) that must be purchased by the consumer, a specific amount of money that must be spent by the consumer, a timeframe during which the offer is valid, and so forth. A customer benefit of an offer is realized during a process sometimes called "redemption," which typically takes place during a transaction between the consumer and a retailer. When the consumer wishes to engage in a transaction the retailer determines whether the conditions of the offer have been met. If so, the retailer, which may be any merchant or other entity that sells products or services, provides the benefit to the consumer on behalf of the offer provider.

In some embodiments, the retailer is in fact the offer provider. In other embodiments, the retailer may then seek compensation for providing the benefit from the offer provider by means of a process known as clearing. During the clearing process, the retailer provides evidence to a third-party clearinghouse, or directly to the offer provider, that the retailer provided the benefit. Assuming the evidence is sufficient, the third-party clearinghouse, or offer provider, provides compensation to the retailer. In embodiments involving a third-party clearinghouse, the offer provider may provide the third-party clearinghouse with funds in advance. The offer provider also sends to the third-party clearinghouse funds from which the compensation is provided, or reimburses the third-party clearinghouse for providing the compensation.

A frequent implicit or explicit term of an offer is that the retailer must be presented with a specific coupon during a transaction. In general, a coupon is a certificate, document, or other physical or electronic construct that entitles a consumer to accept an offer described or referenced by the coupon, thereby realizing the benefit of the offer. A coupon sometimes takes a "hard copy" form, such as a paper certificate, with printed images and/or text describing terms of the offer. The process of the consumer accepting an offer by presenting, referencing, or otherwise providing a coupon while purchasing, contracting, or otherwise transacting with another party involves "redeeming" the coupon. For example, a consumer may redeem a hard copy of a coupon by handing the copy to a clerk during a purchase at a retail store. The clerk may then provide the consumer with the subject of the offer, such as a discounted price, item, service or gift.

One technique for distributing coupons is to include printed coupons with newspapers, magazines, or other items that are distributed to consumers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide consumers with opportunities to print their own coupons. For example, a number of websites provide search engines or catalogs with which consumers may locate offers and then print coupons for the offers they find. The printed coupons may be used in the same manner as any other coupon.

Other recent distribution techniques involve creating digital coupons. One such technique involves creating unique digital coupons that are saved to an account associated with the consumer, such as a store loyalty account. The consumer may redeem such digital coupons during online or physical transactions by presenting an account identifier, such as a store loyalty card or an oral identification of the consumer's telephone number, for the associated account. Since many consumer accounts are tied to card-based identifiers, such as store loyalty cards or credit cards, the process of storing a digital coupon identifier to an account may also be referred to as saving a coupon to a card. Some examples of such techniques are described in U.S. application Ser. No. 12/878,231, filed Sep. 9, 2010, the entire contents of which are hereby incorporated by reference for all purposes as if fully set forth herein.

Another digital coupon-based technique involves creating unique digital coupons that may be stored on a computing device. The digital coupons may be transmitted from the computing device to a point-of-sale during a transaction using any of a variety of mechanisms. For example, information about the digital coupon may be uploaded to the point-of-sale during an online transaction involving the computing device. As another example, information about the digital coupon may be transmitted wirelessly from a smartphone to a receiving component coupled to a checkout register during a transaction at a brick-and-mortar store.

Considering the current state of the industry and market for digital offers (including digital coupons and other digital promotional discount vehicles), there is a need for improved systems, methods and technology platforms for generating, processing, storing, managing and delivering digital offers, for enhancing and customizing the digital offer experience of consumers in general, for increasing the value and benefits derived by consumers from digital offers, for improving the ability of offer providers, offer distributors and retailers to customize digital offer selection, delivery, utilization, management, monetization and redemption analysis, and for otherwise increasing the efficiency and financial return of the digital offer industry and market.

DESCRIPTION OF EXAMPLE EMBODIMENTS

In the following description, for the purposes of explanation, numerous details are set forth in order to provide a thorough understanding of various embodiments of the present invention. It will be apparent, however, that various embodiments of the present invention may be practiced without these specific details. In other instances, well-known structures and devices are shown in block diagram form in order to avoid unnecessarily obscuring the present invention.

1.0. General Overview

The following describes systems and methods for addressing needs such as described above, among other needs, by integrating and processing transaction data from a plurality of retailers in connection with digital offers, including digital coupons and other digital promotional discount vehicles, in accordance with various embodiments.

In other aspects, the invention encompasses data processing systems comprising logic modules implemented at least partially by one or more processors, as well as memories and other computer-readable media configured to carry out the foregoing steps.

2.0. Structural Overview

Figure 1:
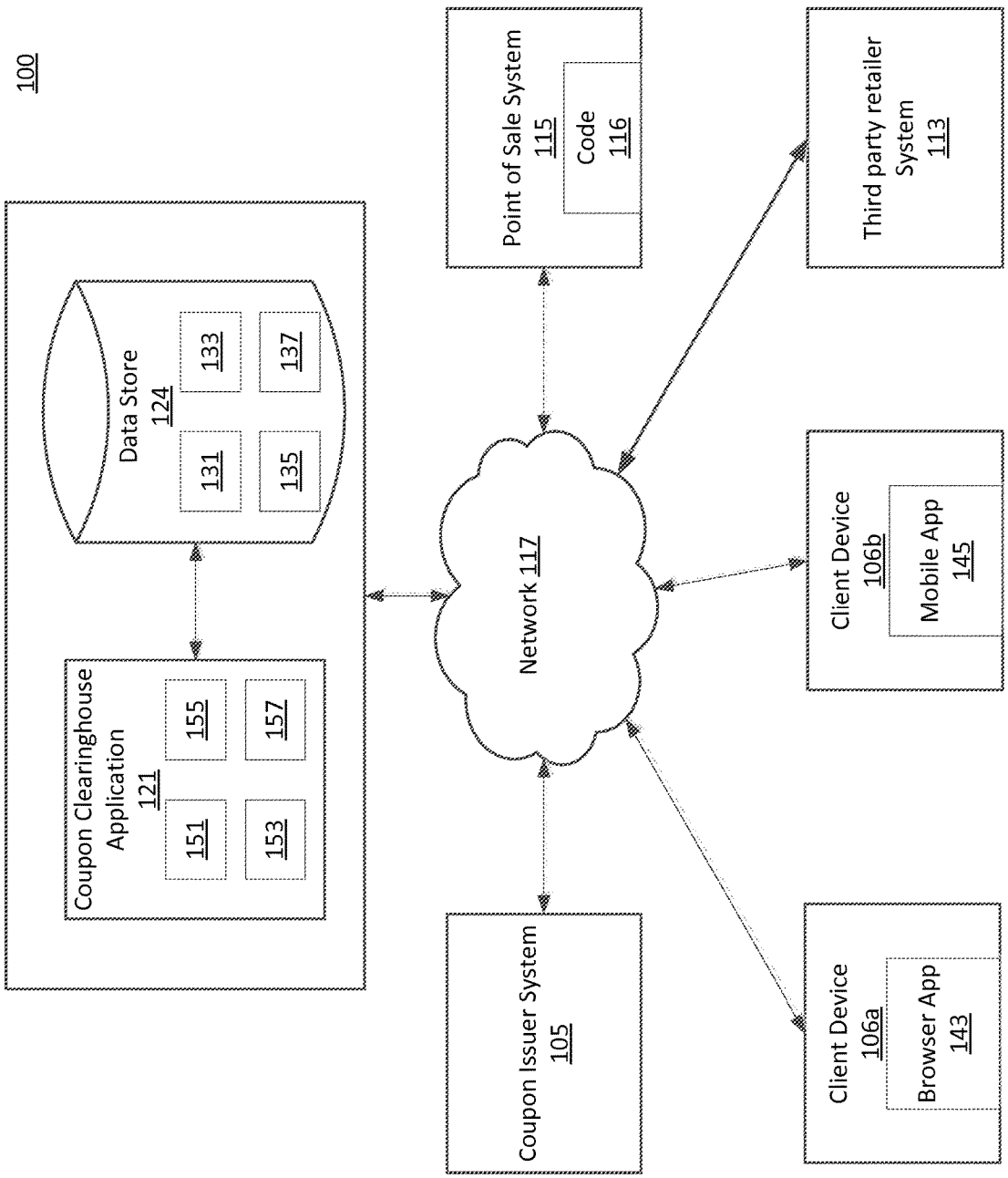
FIG. 1 is a drawing of a networked environment according to various embodiments of the present disclosure.

FIG. 1 illustrates a networked environment 100 according to various embodiments in which a digital offer (e.g., coupon) system can be implemented. The networked environment 100 includes at least one clearinghouse system 103 in communication with an offer issuer system 105, one or more client devices 106, at least one third party retailer system 113 and/or at least one point of sale system 115. The various components shown in the networked environment 100 of FIG. 1 can be in communication via one or more networks 117, which can include, for example, the Internet, intranets, extranets, wide area networks (WANs), local area networks (LANs), wired networks, wireless networks, or other suitable networks, etc., or any combination of two or more such networks.

Clearinghouse system 103 may comprise, for example, a server computer or any other system providing computing capability. Alternatively, clearinghouse system 103 may a plurality of computing devices arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the clearinghouse system 103 is referred to herein as comprising a single computing device. It is understood that a plurality of computing devices 103 may be employed in the various arrangements as described above.

The offer issuer system 105 can also represent one or more computing devices with which an offer issuer can communicate with the clearinghouse system 103. Likewise, the third party retailer system 113 and/or point of sale system 115 can represent one or more computing devices in communication with the clearinghouse system 103 implementing the digital offer functionality described herein. The third party retailer system 113 can implement a third party retailer site that implements an electronic commerce system where users can purchase products and/or redeem offers, such as digital coupons. Similarly, the point of sale system 115 can represent one or more point of sale computing devices that are operated by a retailer, where users can purchase products and/or redeem offers, such as digital coupons. The remainder of the present disclosure discusses redemption of digital coupons for the sake of convenience.

The clearinghouse system 103 is configured to execute one or more applications including an offer clearinghouse application 121. The offer clearinghouse application 121 is executed to facilitate distribution and redemption of offers, such as digital coupons as will be described herein. In some embodiments, offer clearinghouse application 121 can receive a coupon specification from an offer issuer system 105 that defines the various properties and/or restrictions associated with a digital coupon funded by the offer issuer system 105. In turn, the offer clearinghouse application 121 can make these digital coupons available to users of the offer clearinghouse application 121. Users may clip these coupons or otherwise associate the digital coupons with a user account, such as a user account associated with offer issuer system 105 and/or third party retailer system 113. Users can then redeem these digital coupons with a third party retailer system 113, a point of sale system 115, and/or other retailer outlets, where the offer clearinghouse application 121 may facilitate authentication of the user, completion of the digital coupon, validation of the digital coupon, and encumbrance of the digital coupon. In this context, encumbrance of a digital coupon can refer to expiring the digital coupon or decrementing a number of uses available for the digital coupon. The offer clearinghouse application 121 can also receive purchase confirmations and/or settlement requests from third party retailer systems 113, point of sale systems 115, or other retail outlets in connection with purchases made by users for which a digital coupon issued by the offer clearinghouse application 121 to the user were used.

Accordingly, the offer clearinghouse application 121 can issue reimbursements to third party retailer systems 113, point of sale systems 115, or other retail outlets and/or their operators for discounts or other promotions designated by the digital coupon. The offer clearinghouse application 121 can also generate reporting metrics for a coupon issuer that includes various statistics and information regarding digital coupon redemption, the users that clip digital coupons, user purchasing history, user browsing history, etc. Additionally, the offer clearinghouse application 121 can generate an invoice for a coupon issuer in connection with reimbursements paid to third party retailer sites and/or point of sale systems. Additional details and variations of the operation of the offer clearinghouse application 121 will be described herein.

At least one client 106 facilitates communication by a user with the offer clearinghouse application 121 as will be described. As illustrated in FIG. 1, a client device 106a may comprise various types of computer systems such as, for example, a desktop, laptop, or other computer system with like capability. Another client device 106b may comprise a personal digital assistant, cell phone, or other portable device with like capability as can be appreciated. The client 106 may interface with the clearinghouse system 103 using various applications such as a browser application 143, dedicated mobile applications 145, or other applications as can be appreciated. In one embodiment, various user interfaces can be generated on a display device of the client 106 to facilitate interaction with the various systems or components implemented on the clearinghouse system 103. In this way, users may interact with the offer clearinghouse application 121 in order to view and/or clip digital coupons available in a digital coupon system implemented by the offer clearinghouse application 121.

Client 106 may be any of a variety of devices, including a personal computer, printer, phone, or portable computing device. In an embodiment, client 106 comprises one or more application components that provide a consumer with an interface to shopper interface 153. Client 106 may be, for example, a standalone software application, a web browser, or a plug-in to a web browser. Client 106 need not necessarily be executed by a device that is owned or even exclusively operated by consumer. For example, client 106 may be executed by an in-store kiosk provided to consumers by retailer 113.

In an embodiment, client 106 is a special-purpose computer configured with logic that can perform the operations described herein during operation. In an embodiment, client 106 is a general-purpose computer that comprises one or more processors, and memory, mass storage device, or other non-transitory computer-readable storage media storing instructions which, when loaded and executed, cause the one or more processors to perform the operations that are further described herein.

Client 106 communicates with offer clearinghouse application 121 over network 117 to receive offer data. The offer data sent to client 106 may include, for instance, a listing of information about offers available to consumer, including offer terms and values, as well as data describing a specific offer in sufficient detail to allow client 106 to display or render a coupon for the offer. Client 106 may, using various input or output mechanisms, allow consumer to view a list of available offers, select a particular offer from that list, and choose whether to clip the coupon for immediate redemption, or to save the offer to a consumer account. In response to consumer selecting the latter option, client 106 may send a request to application 121 to save the selected offer to consumer's account.

In an embodiment, client 106 is a wireless, portable, and/or battery powered computing device that the consumer commonly keeps with him or her while traveling, such as a phone, tablet, personal digital assistant, watch, and so forth. Client 106 is configured to execute instructions for a graphical coupon client interface by which the consumer communicates with offer server 510. The coupon client interface may be provided by, for instance, a mobile application 145 or a web application 143.

The offer issuer system 105 and third party retailer system 113 can also communicate with the offer clearinghouse application 121 via user interfaces rendered in a browser executed in corresponding computing devices. Additionally, they may communicate with the offer clearinghouse application 121 via application programming interfaces (APIs) provided by the offer clearinghouse application 121. As one example, the offer clearinghouse application 121 can provide a web service API with which third party retailer systems 113 can communicate in order to facilitate redemption of a digital coupon by a user in association with a purchase of products in a shopping cart and subsequent reimbursement of a promotion provided to the user in connection with the sale.

Figure 2:
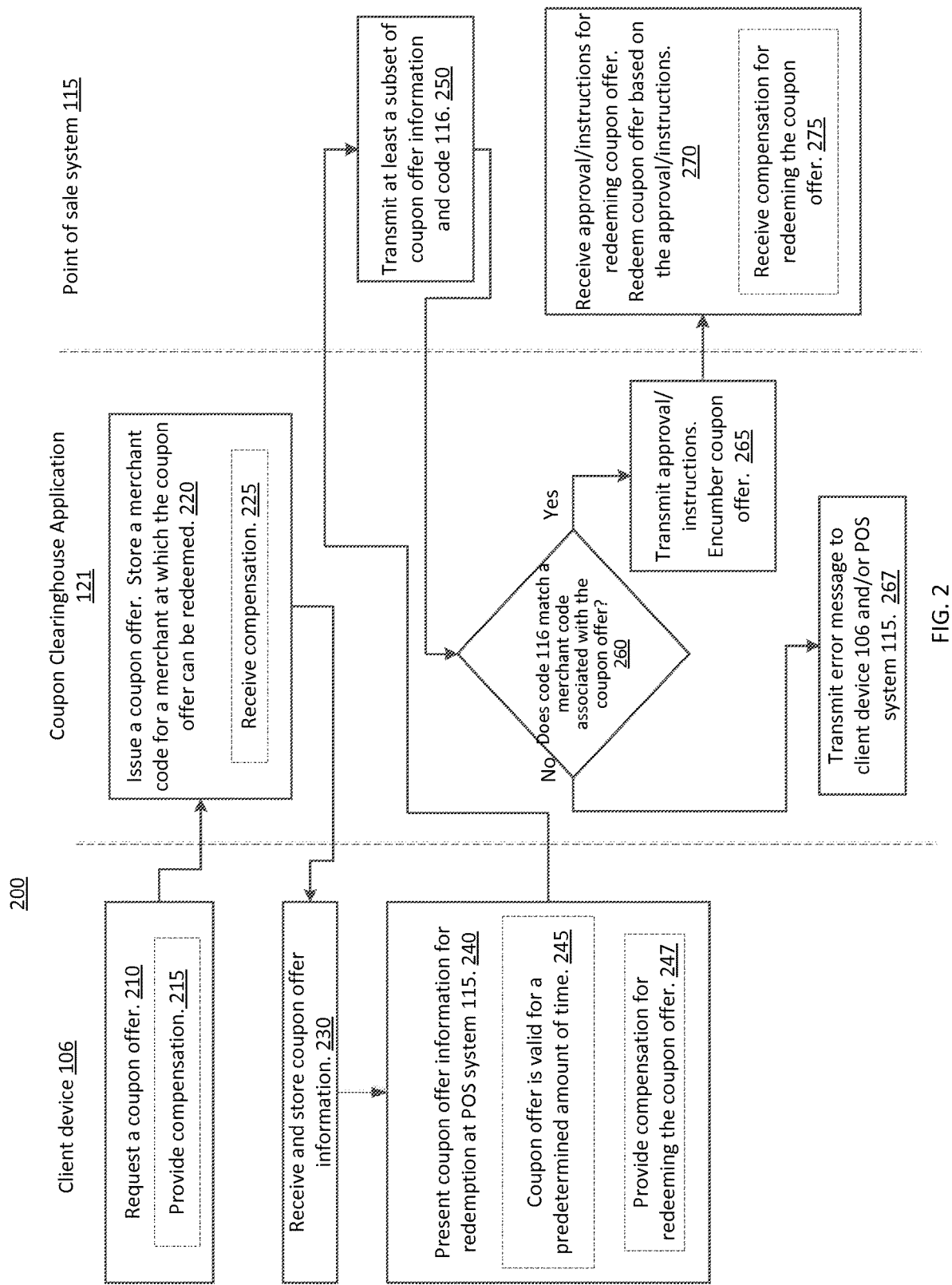
FIG. 2 is a process flow illustrating an embodiment of a method of providing offers at a consumer-operated device and redeeming offers at a point of sale system.
Figure 3:
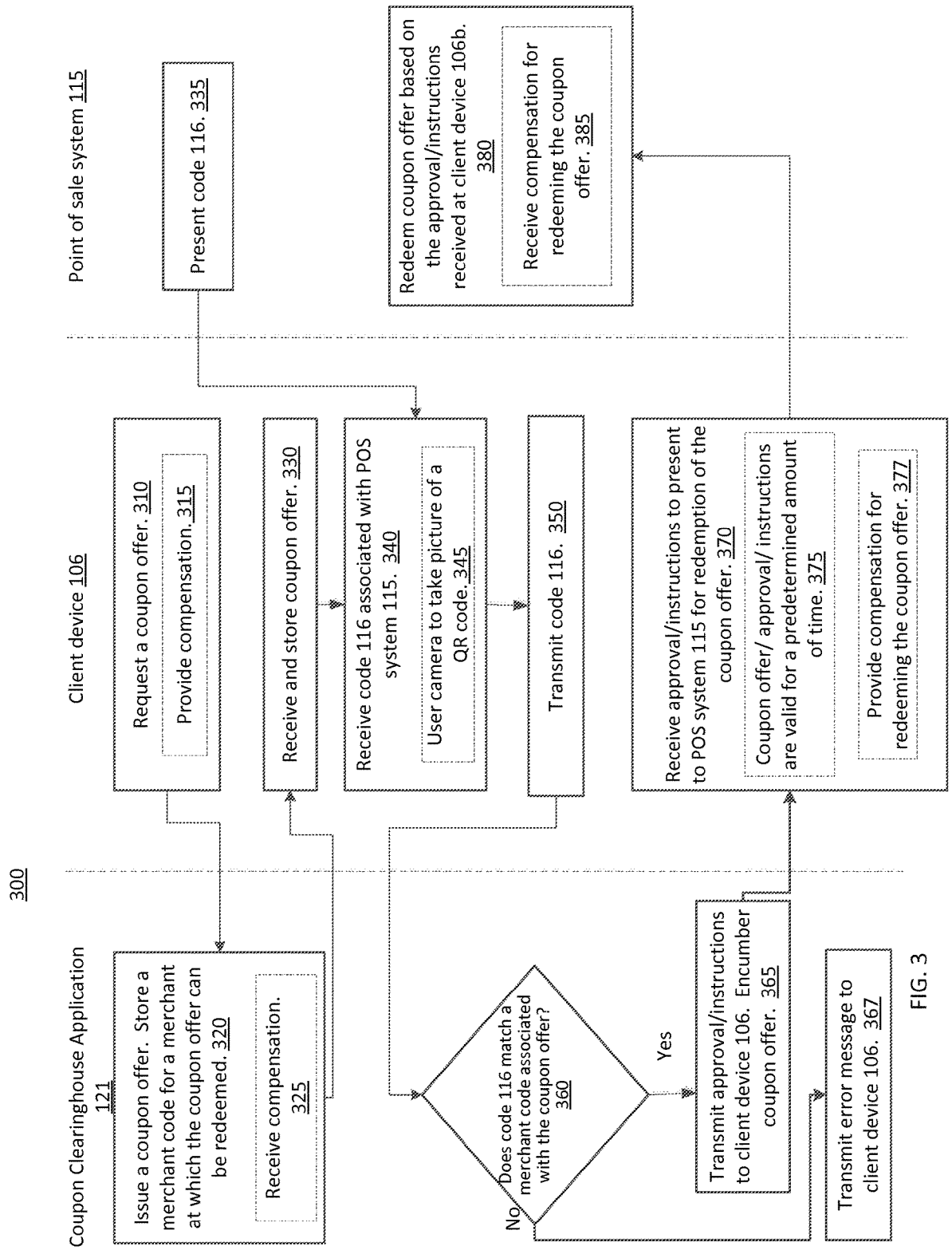
FIG. 3 is a process flow illustrating an embodiment of a method of providing offers at a consumer-operated device and redeeming offers at a point of sale system.

In some embodiments, e.g., as discussed further with reference to FIGS. 2 and 3, the point of sale system 115 can also communicate with the offer clearinghouse application 121, e.g., via user interfaces rendered in a browser executed in corresponding computing devices, via application programming interfaces (APIs) provided by the offer clearinghouse application 121, and so on. As one example, the offer clearinghouse application 121 can provide a web service API with which point of sale system 115 can communicate in order to facilitate redemption of a digital coupon by a user in association with a purchase of products in a shopping cart and subsequent reimbursement of a promotion provided to the user in connection with the sale.

Figure 4:
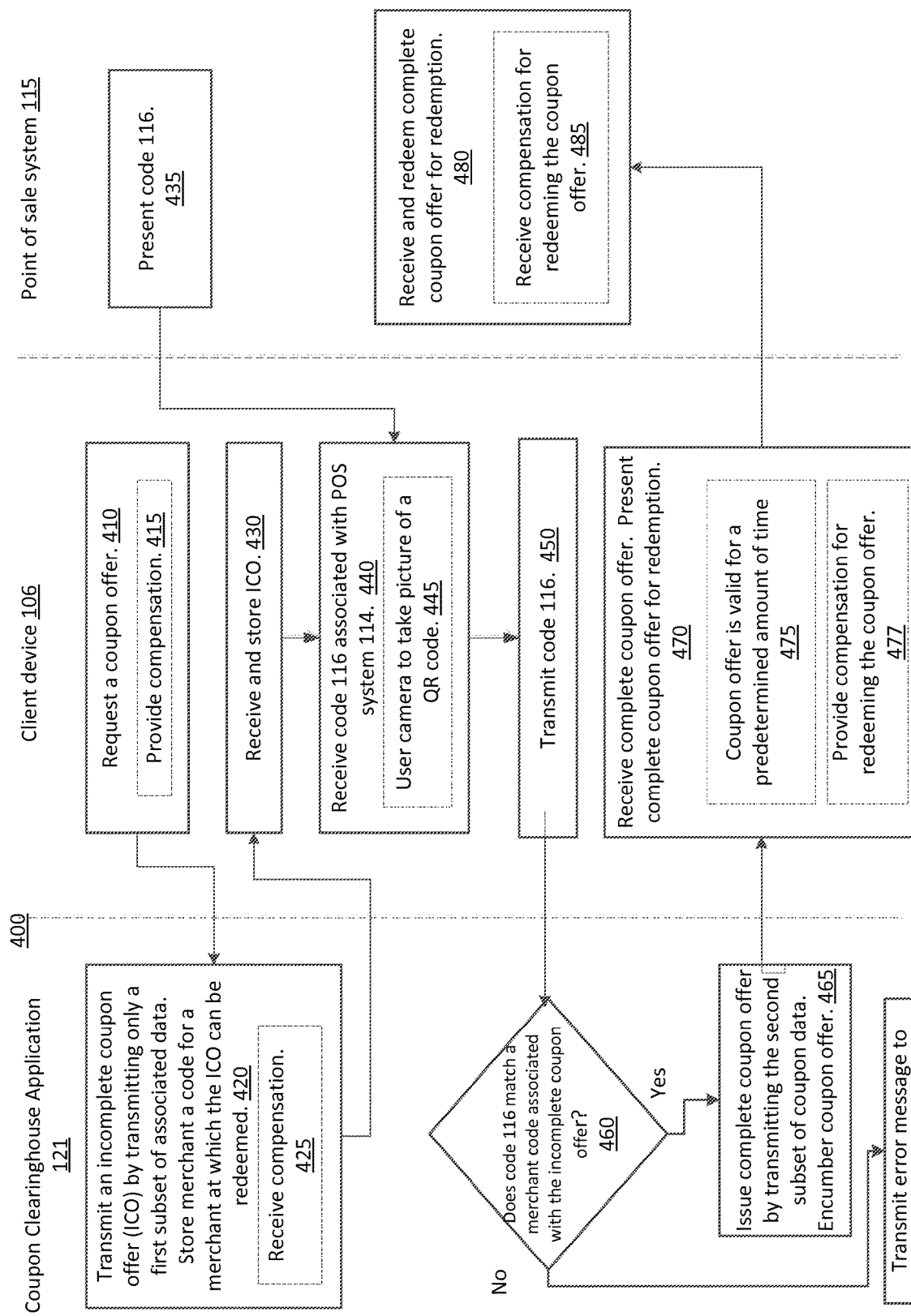
FIG. 4 is a process flow illustrating an embodiment of a method of providing offers at a consumer-operated device and redeeming offers at a point of sale system.

In other embodiments, e.g., as discussed further with reference to FIG. 4, the point of sale system 115 cannot communicate with the offer clearinghouse application 121. The point of sale system 115 can be a dumb system that is incapable of e.g., connecting with network 117 or may have temporarily (e.g., as a result of power interruption, service interruption, etc.) lost communication with the offer clearinghouse application 121. To illustrate the point that in these embodiments, e.g., as discussed further with reference to FIG. 4, the point of sale system 115 cannot communicate with the offer clearinghouse application 121, an arrow between network 117 and point of sale system 115 in FIG. 1 is drawn as being dotted.

Accordingly, in order to manage the various interactions with the various entities in a digital coupon system, the offer clearinghouse application 121 can provide various interfaces that facilitate communication with offer issuer systems 105, users on a client 106, third party retailer system 113, and/or point of sale systems 115. To this end, the offer clearinghouse application 121 can execute a coupon issuer interface 151, a shopper interface 153, a third party retailer site interface 155, and a point of sale interface 157.

It should be appreciated that the depicted illustration of the offer clearinghouse application 121 and the description of various interfaces is non-limiting, and is presented for ease of describing the various interactions with various entities and/or actors in connection with a digital coupon system implemented by the offer clearinghouse application 121. The offer clearinghouse application 121 can provide one or more coupon user interfaces with which a user may interact on a client 106 in order to clip coupons rendered in the user interface. The offer clearinghouse application 121 can display coupons according to various categories and generate coupon recommendations based on a user profile, which can also be displayed in a coupon user interface on a client 106.

A coupon issuer interface 151 is executed by the offer clearinghouse application 121 to interact with an offer issuer system 105. An offer issuer system 105 can initiate digital coupon campaigns via a digital coupon system implemented by the offer clearinghouse application 121. The offer issuer system 105 can transmit a coupon specification that defines at least one digital coupon via a user interface generated by the coupon issuer interface 151 and rendered on the offer issuer system 105. Alternatively, the offer issuer system 105 can transmit a data file to the coupon issuer interface 151 that contains a coupon specification defining at least one digital coupon. The coupon issuer interface 151 can parse the data file to determine the parameters of one or more digital coupons defined in the coupon specification received from the offer issuer system 105. In another embodiment, the coupon issuer interface 151 can provide a network page interface and/or an application programming interface (API) accessible over a network with which a coupon issuer can interact in order to define a coupon specification.

A coupon specification received by the coupon issuer interface 151 from a coupon issuer can define various parameters and/or restrictions regarding one or more digital coupons. A coupon specification can define one or more products to which a digital coupon applies. Products can be defined by the coupon identifier by identifying one or more product identifiers. A product identifier can include a universal product code, a model number, a serial number, a stock keeping unit, or any other identifier that can uniquely identify a product or a class of products. The coupon specification can specify that a digital coupon defined by the coupon specification is applicable to a bundle of products by defining multiple products in a coupon specification and designating that multiple products identified in the specification are required to be purchased by a user in order for the digital coupon to become applicable. The coupon specification can also include a coupon issuer identifier or tracking number, which can be used by a coupon issuer to track metrics such as redemption rate, clip rate, and other metrics. To this end, the coupon issuer interface 151 can provide such an identifier or tracking number in connection with coupon metric reports and/or invoices transmitted from the offer clearinghouse application 121 to the offer issuer system 105.

The coupon specification received by the coupon issuer interface 151 can also define a coupon face value or a promotion applicable to one or more products or class of products identified by the coupon specification. The promotion can include an amount by which products identified by the one or more product identifiers can be discounted (e.g., a dollar amount, a percentage of a sales price, a percentage of a manufacturer's suggested retail price, etc.). Additionally, the promotion can define one or more complimentary or discounted products that can be provided to a consumer in connection with redemption of a digital coupon. In other words, the promotion can define an amount that the coupon issuer is willing to reimburse a third party retailer in connection with redemption of a digital coupon defined by the coupon specification. The coupon specification can also define an amount which the coupon issuer is willing compensate an operator of the offer clearinghouse application 121 for each user that views and/or clips a digital coupon.

The coupon specification can additionally specify a campaign budget and/or an expiration date associated with one or more digital coupons defined by the coupon specification. A campaign budget can specify a total amount the coupon issuer is willing to reimburse retailers in connection with redemption of a digital coupon. The coupon specification can also specify one or more retailers with which the digital coupon can be used. In this way, the coupon issuer can restrict redemption of a digital coupon to a select number of third party retailer systems 113, point of sale systems 115, or other retail outlets.

The coupon specification transmitted from an offer issuer system 105 to the coupon clearinghouse 121 through the coupon issuer interface 151 can also define targeting criteria for the digital coupon. Targeting criteria can specify parameters regarding users of the offer clearinghouse application 121 that are eligible to view and/or clip a digital coupon specified by the coupon specification. The targeting criteria, in one example, can specify that a particular digital coupon can only be viewed by a user who has purchased and/or viewed a particular product or class of products. In another example, the targeting criteria can specify that a digital coupon is only available to be clipped by users matching certain demographic information, such as, but not limited to, age, sex, income level, location, etc. In this way, a coupon issuer associated with a digital coupon can precisely target certain users, as the offer clearinghouse application 121 maintains various information about a user in a user account that can be used to target digital coupons.

A shopper interface 153 executed by the offer clearinghouse application 121 can facilitate interactions with a user associated with a user account accessible to the offer clearinghouse application 121. The shopper interface 153 can generate a coupon user interface with which a user can view and/or request digital coupons initiated by digital coupon campaigns from coupon issuers and that are available via the offer clearinghouse application 121. Alternatively, the shopper interface 153 can transmit data to an application, such as the mobile application 145, that is tailored to allow a user to view and/or clip digital coupons. In some embodiments, a client device 106a/106b may execute client-side code to render a user interface based at least upon data regarding digital coupons provided by the shopper interface 153.

Accordingly, shopper interface 153 can authenticate credentials of a user associated with a user account. In some embodiments, the shopper interface 153 can establish a session associated with the user account and the client device 106 on which a user is interacting with the shopper interface 153. The shopper interface 153 can transmit a session identifier, such as a browser cookie, that can be stored in a browser application 143 and/or mobile application 145 that establishes a user identifier associated with the user account. In this way, a user can browse a third party retailer site 113, which can have access to such a session identifier and/or a user identifier stored therein to establish an identity of the user within a digital coupon system implemented by the offer clearinghouse application 121 and request information from the offer clearinghouse application 121 regarding digital coupons associated with the user. In some embodiments, the shopper interface 153 can also obfuscate and/or encrypt identifying information within such a session identifier to protect the privacy of a user.

The shopper interface 153 can provide coupon and/or product recommendations based at least upon user profile data associated with a user account. The offer clearinghouse application 121 can maintain user data 131 that can include coupon clipping/request history data, demographic information, purchase history, and other marketing data regarding a user. User data 131 is discussed further with reference to FIG. 7. Accordingly, the shopper interface 153 can identify products and/or digital coupons to recommend based upon the various profile data accessible to the offer clearinghouse application 121.

The shopper interface 153 can also transmit digital coupons associated with a user account to a mobile device associated with a user. In this way, a user can clip digital coupons available via the offer clearinghouse application 121 and load these digital coupons on a mobile device for redemption with a third party retailer system 113, a point of sale system 115 or other retail outlets. In one embodiment, the shopper interface 153 can transmit a representation of the digital coupon to a mobile application 145 executed on a client device 106*b*, which can render a bar code on a display device 141 that identifies a digital coupon. A bar code scanner in communication with a point of sale system 115 can scan such a bar code for redemption of the coupon by the user in connection with a purchase of products identified by a coupon specification defining the digital coupon. In the embodiment discussed in FIG. 2, the point of sale system 115 can communicate with the offer clearinghouse application 121 to validate and subsequently encumber the digital coupon upon redemption. Interactions between a point of sale system 115 and the offer clearinghouse application 121 will be discussed in greater detail with reference to the discussion of the point of sale (POS) interface 157.

The third party retailer site interface 155 can be executed to facilitate interactions with a third party retailer system 113. The third party retailer site interface 155 can provide an application programming interface (API) or other appropriate interface with which a third party retailer system 113 can interact to identify users and their associated digital coupons as well as provide data regarding digital coupon redemption and reimbursement requests. In one embodiment, the third party retailer site interface 155 can provide web service API so that a third party retailer system 113 can transmit and/or receive text based data or other data regarding the various interactions between the digital coupon system and third party retailer system 113.

An account accessible to the offer clearinghouse application 121 associated with a third party retailer system 113 can be authenticated by the third party retailer site interface 155. In some embodiments, a third party retailer system 113 can access a session identifier (e.g., a browser cookie) established by the shopper interface 153 when a user authenticates a user account via the shopper interface 153. When a user attempts to purchase one or more products via a virtual shopping cart in the third party retailer system 113, the third party retailer system 113 can transmit a user identifier associated with the session identifier to the third party retailer site interface 155, which can validate the user identity and provide one or more digital coupons associated with the user account to the third party retailer system 113. Additionally, the third party retailer system 113 can transmit one or more product identifiers associated with a virtual shopping cart of the user as well as quantities of the products in the cart. Accordingly, the third party retailer site interface 155 can transmit product identifiers and a promotion associated with the product identifiers so that the third party retailer system 113 can apply a promotion associated with one or more applicable digital coupons to eligible products associated with a virtual shopping cart of the user.

In some embodiments, the third party retailer system 113 can encrypt a user identifier and/or session identifier transmitted to the third party retailer site interface 155, which can decrypt the identifier in order to authenticate a user and provide information regarding digital coupons. In some embodiments, the third party retailer system 113 can provide additional data regarding a user in addition to the user identifier so that a user identity can be verified. As one example, the third party retailer system 113 can provide an e-mail address, name, shipping address, phone number, or other identifying data so that if, for example, a browser cookie associated with a session of the user is established on a public computer, digital coupons may not be encumbered by other users. In this scenario, the third party retailer system 113 can encrypt this additional identifying information, which can be decrypted by the third party retailer site interface 155.

In another example, the third party retailer system 113 can hash this additional identifying information and provide a hashed value and/or hash signature to the third party retailer site interface 155. The third party retailer site interface 155 can then determine whether the hashed value and/or hash signature corresponding to identifying information of the user matches a hashed value and/or hash signature corresponding to information stored about the user in data store 124 accessible to the offer clearinghouse application 121.

Upon receiving information regarding applicable digital coupons from the third party retailer site interface 155, the third party retailer system 113 can generate a purchase confirmation that can be received by the third party retailer site interface 155. The purchase confirmation can specify the digital coupons that were applied and/or a promotion provided to the user in connection with the purchase. Upon receiving a purchase confirmation associated with a particular user as well as one or more digital coupons applied to a purchase, the offer clearinghouse application 121 can encumber the digital coupons associated with the account of the user. The purchase confirmation can also provide a shipment confirmation and/or shipment tracking data associated with the purchase, so that the third party retailer site interface 155 can validate shipment of the products. In one example, reimbursement of a third party retailer site can be initiated when the third party retailer site interface 155 receives a purchase confirmation from the third party retailer system 113. In other embodiments, the third party retailer system 113 can transmit a settlement request or reimbursement request in connection with a purchase confirmation to the third party retailer site interface 155, which outlines an amount by which the third party retailer 113 is to be reimbursed in connection with redemption of a digital coupon by a user. Accordingly, the third party retailer site interface 155 can initiate electronic payment to a third party retailer site operating a third party retailer system 113 and transmit a corresponding electronic confirmation. Purchase confirmations and/or reimbursement requests can be exchanged between a third party retailer system 113 and the third party retailer site interface 155 on a purchase by purchase basis or on a batch basis, whereby the third party retailer system 113 transmits a plurality of confirmations and/or an aggregate reimbursement requests associated with a plurality of purchases where digital coupons were applied.

Additionally, if a transaction that is processed by the offer clearinghouse application 121 is cancelled after it is processed, the offer clearinghouse application 121 can receive an order cancellation notice from a third party retailer system 113 and/or a point of sale system 115. Accordingly, the offer clearinghouse application 121 can unencumber a digital coupon associated with a user so that it may be used again. Additionally, the offer clearinghouse application 121 can facilitate reimbursement from a third party retailer of a coupon amount initially paid to a third party retailer in connection with the transaction.

The third party retailer site interface 155 can also enforce minimum advertised pricing rules specified by a coupon issuer in a coupon specification. Accordingly, the third party retailer site interface 155 can receive an advertised selling price associated with a product in a third party retailer system 113. If the selling price violates a minimum advertised pricing rule specified by the coupon specification associated with a digital coupon, the third party retailer site interface 155 can transmit a message to the third party retailer system 113 that denies redemption of the digital coupon.

The third party retailer site interface 155 can also receive an inventory audit report associated with products for which the third party retailer system 113 redeemed coupons on behalf of users. In this way, the third party retailer site interface 155 can perform a form of fraud detection. In some embodiments, an inventory audit report can include proof that a third party retailer site has paid for inventory covering reimbursement requests submitted by one or more third party retailer systems 113 associated with a third party retailer site to the third party retailer site interface 155 over a period of time.

In other embodiments, the third party retailer site interface 155 can transmit data regarding digital coupons associated with a user account that are in turn associated with products that may not be in a virtual shopping cart on the third party retailer system 113. In this way, the third party retailer system 113 can provide additional product recommendations for products available via the third party retailer system 113 that are relevant to digital coupons associated with a user account, even though these products may not be in a virtual shopping cart of the user. Additionally, the third party retailer site interface 155 can transmit information regarding digital coupons available via a digital coupon system implemented by the offer clearinghouse application 121 that are not presently associated with a user account, and that correspond to products available via the third party retailer system 113 so that the third party retailer system 113 can recommend these products and/or digital coupons.

In the embodiment discussed in FIG. 2, point of sale system interface 157 can be executed by the offer clearinghouse application 121 to facilitate redemption of digital coupons in a point of sale system 115 in communication with a digital coupon system implemented by the offer clearinghouse application 121. As noted above, in one embodiment, digital coupons associated with a user account can be transmitted to a mobile application 145, which can display a bar code or provide another identifier associated with the digital coupon. A representation of the digital coupon can be generated by the shopper interface 153 such that it uniquely identifies the digital coupon and/or the user account with which the digital coupon is associated. A point of sale system 115 can receive a bar code or other identifier associated with the digital coupon. In the embodiment discussed in FIG. 2, point of sale system 115 transmits the identifier to the point of sale system interface 157 to validate whether the digital coupon should be redeemed or honored by the point of sale system.

The point of sale interface 157 can validate the digital coupon presented by a user via a mobile device by receiving an identifier that identifies the digital coupon as well as products associated with a purchase in the point of sale system 115. The point of sale interface 157 can then determine whether a promotion associated with the digital coupon should be provided to the user in connection with the purchase by determining whether the products associated with the purchase qualify for the promotion, whether the digital coupon remains valid due to a campaign budget and/or an expiration date specified by a coupon specification, and/or whether the digital coupon remains valid due to its being used in excess of a number of uses specified by the coupon specification. Upon validating a digital coupon received from the point of sale system 115 in this way, the point of sale interface 157 can encumber the digital coupon associated with the user account as described above.

The clearinghouse system 103 can include (or otherwise access) at least one data store 124, which may comprise data and applications operable to provide access to the data stored therein. Data store 124 may comprise one or more databases and/or file repositories. It should be appreciated that the data store 124 may or may not reside within a computing device 103, but may be accessible via a network to the clearinghouse system 103.

The data store 124 may be used to store user data 131 associated with user accounts of users of the offer clearinghouse application 121. User data 731 can include, for example, user profile data, which can include demographic information about a user, user authentication information, user login information, shipping addresses, telephone numbers, payment information, e-mail addresses, purchasing history, product browsing history, a digital coupon usage history (including coupons issued to the user), a digital coupon clipping history, affinity groups with which the user is affiliated, and other data related to users. The user data 131 can also include data regarding digital coupons the user has clipped and are presently associated with a user account. In some embodiments, user data 131 can also include a unique key pair issued to the user, as discussed further with reference to FIG. 5. 5).

The data store 124 can also include issuer data 133, which includes data regarding coupon issuers 105. The issuer data 133 can include various data regarding a coupon issuer account accessible to the offer clearinghouse application 121. For example, the issuer data 133 can include profile data regarding a coupon issuer, such as, but not limited to, data regarding payments for coupon campaigns, products available via an electronic commerce system that are associated with the coupon issuer, digital coupons issued by and associated with the coupon issuer, and other data as can be appreciated.

The data store 124 can also include offer data 135, which includes data regarding specific digital coupons that are specified by a coupon issuer. Among other aspects, coupon data may comprise, for each offer, data such as the name of the offer provider making the offer, distribution parameters, terms of the offer, print layout information and graphics, one or more internal or provider identification numbers, bar code generation information, one or more relevant uniform resource locators (URLs), one or more offer names or titles, one or more related search terms, clearinghouse information, and one or more related categories. Distribution parameters may include aggregate distribution limit values, per device distribution limit values, per region distribution limit values, and/or per client distribution limit values.

As noted above, a coupon issuer can, via an offer issuer system 105, create a digital coupon campaign that is facilitated by the offer clearinghouse application 121 by transmitting a coupon specification to the offer clearinghouse application 121. A coupon specification can include various information regarding one or more digital coupons such as a product identifier associated with the digital coupon as well as targeting criteria, and can be stored in offer data 135. Targeting criteria associated with a digital coupon can define requirements for users to which a digital coupon should be made available by the offer clearinghouse application 121. A coupon specification can also specify a promotion associated with a digital coupon, which can include a discount amount the coupon issuer is willing to reimburse to a third party retailer, a complimentary or discounted product provided is association with a particular product, and other coupon promotions as can be appreciated. A discount amount can include a fixed amount and/or a percentage of a selling price. The coupon specification can also specify a digital coupon expiration date and/or campaign budget, which describes a maximum amount a coupon issuer is willing to reimburse third party retailer sites and/or point of sale system operators in connection with a digital coupon campaign.

The coupon specification can further include retailer restrictions, which can limit those third party retailers with which a digital coupon is eligible to be redeemed. In this way, in one embodiment, a coupon issuer communicating with the offer clearinghouse application 121 via an offer issuer system 105 can limit a digital coupon campaign to authorized dealers of a product sold by the coupon issuer. In another embodiment, the coupon issuer can limit a digital coupon campaign to retailers that served a desired demographic. Other variations should be appreciated and will be discussed in more detail herein.

The data store 124 can also include retailer data 137, which includes data regarding third party retailer systems 113, point of sale systems 115, and/or other retail outlets and their operators. Retailer data 137 can include information regarding redemptions of digital coupons issued by the offer clearinghouse application 121 by users with various retailers. The offer clearinghouse application 121 can facilitate redemption of digital coupons with third party retailers who may operate third party retailer systems 113, point of sale systems 115 or other systems and store data regarding the redemption in retailer data 137. Retailer data 137 can include a volume of redeemed coupons, an account balance associated with a retailer, data regarding a fraud history, data regarding products available via a particular retailer, and other data as can be appreciated. Additionally, retailer data 137 can include identifiers that specify an identity of various point of sale systems 115 that may be associated with a retailer. As can be appreciated, a retailer may operate numerous point of sale systems 115 that can interact with the offer clearinghouse application 121. An identifier can be stored in retailer data 137 in order to identify a third party retailer associated with a point of sale system 115 and record information about coupon redemptions at the point of sale system 115 as well as enforce digital coupon restrictions.

The data store 124 can also include other data related to users, coupon issuers, retailers and digital coupons as can be appreciated, but are not necessary to discuss herein for an understanding of the various embodiments of the disclosure. Additionally, it should be appreciated that the data store 124 can be implemented in a separate computing device that may be located in a separate installation or location. The depicted table structure of the data store 124 is one example of how data can be structured therein according to embodiments of this disclosure. However, it should be appreciated that data can be structured in many different ways across multiple data stores implemented in various computing devices. As one example, data related to users, coupon issuers, digital coupons, third party retailers, and other data can be extracted by the offer clearinghouse application 121 by performing queries against data stored in the data store in wholly different table structures. Accordingly, it should be appreciated that the depicted data store 124 and the table structure shown therein is but one example given for ease of depiction and explanation of various embodiments of this disclosure.

FIG. 2 is a process flow 200 illustrating a method of providing offers at a consumer-operated device, such as client device 106, according to an embodiment. In the process flow 200, both client device 106 and point of sale system 115 communicate with offer clearinghouse application 121 to redeem a digital coupon offer.

Process 200 begins with client device 106 requesting a coupon offer from offer clearinghouse application 121, e.g. using shopper interface 153 (210). In some embodiments, optionally, the request for the coupon offer includes compensation to offer clearinghouse application 121 in order to obtain the coupon offer (215). Compensation may be in the form of electronic monetary payment, loyalty reward currency (i.e., dollars, points, frequent flyer miles, cellular telephone minutes, in-kind rewards, etc.), and so on.

In response to receiving the request from client device 106 for a coupon offer, offer clearinghouse application 121 issues a coupon offer (220). Offer clearinghouse application 121 also stores a code for at least one merchant/retailer at which the coupon offer can be redeemed (220). In some embodiments, the code is stored in data store 124. As an example, for a coupon offer for $1 off milk, offer clearinghouse application 121 may store multiple codes, each code corresponding to a respective store (such as retail stores, pharmacies, etc.) at which the coupon can be redeemed. As another example, for a coupon offer for $10 off dry-cleaning bill at a particular dry-cleaning store chain, offer clearinghouse application 121 may store multiple codes, a respective code corresponding to a respective store within the dry-cleaning store chain at which the coupon can be redeemed. As a third example, for a coupon offer for $10 off lunch bill at a particular restaurant, offer clearinghouse application 121 may store a single code corresponding to the restaurant at which the coupon can be redeemed.

Offer clearinghouse application 121 may further update a bookkeeping database, e.g., to decrement global offer limits associated with the issued coupon offer and may further update user database 131, e.g., to decrement user specific limits. Offer clearinghouse application 121 may further update a user record associated with client device 106 and/or the particular instance of application 145 on client device 106 in user database 131, e.g., to store the unique coupon identifier as active and issued to a specific user at a specific timestamp.

In some embodiments, optionally, offer clearinghouse application 121 issues a coupon offer (220) only in response to receiving compensation (225). As an example, in order to issue a coupon offer for $10 off lunch bill at a particular restaurant, offer clearinghouse application 121 may receive compensation of e.g., $5 from client device 106 or a user of client device 106.

Client device 106 receives coupon offer information from offer clearinghouse application 121, e.g., via shopper interface 153 (230). Client device 106 may store the received coupon offer information on the client device 106, e.g., in memory associated with mobile application 145. In some embodiments, the received coupon offer information that is received by client device 106 may include a representation (e.g., a bar code) that uniquely identifies the digital coupon offer.

Subsequent to receiving and storing coupon offer information, client device 106 presents the stored coupon offer information for redemption at point of sale system 115 (240). For e.g., user of client device 106b opens up mobile application 145 and selects the coupon offer (e.g., from a plurality of stored coupon offers) for redemption. In some embodiments, a mobile device 106 can wirelessly communicate with the point of sale system 115 via a wireless networking protocol and perform a handshake with the point of sale system to exchange data. In other embodiments, the point of sale system 115 and a mobile device 106 can communicate over a network such as the Internet. In still other embodiments, user of mobile device 106 physically presents the mobile device 106 to a point of sale system 115.

In some embodiments, optionally, upon the user of client device 106 opening up mobile application 145 and selecting the coupon offer that the user wishes to redeem, the coupon offer remains valid for a predetermined amount of time (245). After the validity term is over, in some embodiments, the coupon offer as stored on the user's mobile application 145 may expire. Thus, as an example, if the user is at the point of sale system 115 and pulls up and presents the coupon offer, say at 2:45 pm, the user may have, say 15 minutes to complete the transaction and redeem the coupon offer. This expiration term can act as a deterrent for the user to try to redeem the same coupon offer more than the number of times the user is authorized to redeem the coupon. As an example, if the coupon offer is limited to two redemptions, after the first redemption, the user may receive a limited window within which to present and redeem the coupon offer.

In some embodiments, optionally, in addition to presenting the stored coupon offer information, user provides compensation at the point of sale system 115 for redeeming the coupon offer (247). As an example, in order to redeem a coupon offer for $10 off lunch bill at a restaurant, user may provide compensation to the point of sale system 115 of $5.

Point of sale system 115 receives the presented coupon offer information from client device 106 and transmits at least a subset of the received coupon offer information and code 116 to offer clearinghouse application 121, e.g., via point of sale system interface 157 (250). The subset of the received coupon offer information that is transmitted by point of sale system 115 may e.g., include a representation that uniquely identifies the digital coupon offer. For e.g., subset of the received coupon offer information that is transmitted by point of sale system 115 may include a unique bar code associated with the digital coupon offer.

In some embodiments, corresponding to block 247 of FIG. 2, point of sale system 115 transmits at least a subset of the received coupon offer information and code 116 to offer clearinghouse application 121 only if compensation is received from client device 106. In some embodiments, corresponding to block 245 of FIG. 2, point of sale system 115 transmits at least a subset of the received coupon offer information and code 116 to offer clearinghouse application 121 only if the coupon offer presented by the client device 106 has not expired and is still valid and other conditions of redemption of coupon offer are met.

Offer clearinghouse application 121 receives the subset of the received coupon offer information and code 116 from point of sale system 115 and determines if code 116 matches the merchant code associated with the digital coupon offer (260). If there is no match, offer clearinghouse application 121 may transmit an error message to one or both of the client device 106 and point of sale system 115 (267). If there is a match with a digital coupon offer, offer clearinghouse application 121 transmits an approval and/or further instructions for redeeming the coupon offer (265). In one embodiment, the information received at the clearinghouse application 121 (at step 260) includes one or more of: an identifier that identifies the digital coupon, identification information for the products/services being purchased, and user information for the client device 106. The clearinghouse application 121 can use the information received at step 260 to determine whether a promotion associated with the digital coupon should be provided to the user in connection with the purchase by determining whether the products associated with the purchase qualify for the promotion, whether the digital coupon remains valid due to a campaign budget and/or an expiration date specified by a coupon specification, and/or whether the digital coupon remains valid due to its being used in excess of a number of uses specified by the coupon specification. Upon validating a digital coupon in this way, the clearinghouse application 121 can encumber the digital coupon associated with the user account (265). For example, for a coupon offer that can be redeemed twice, offer clearinghouse application 121 marks the coupon offer as having been used once.

Point of sale system 115 receives the approval and/or further instructions for redeeming the coupon offer, e.g., via point of sale system interface 157, and redeems the digital coupon offer based thereon (270). In some embodiments, point of sale system 115 redeems the digital coupon offer only if compensation is received from client device 106 (275). As an example, in order to redeem a coupon offer for $10 off lunch bill, Point of sale system 115 at the restaurant may receive compensation of e.g., $5.

FIG. 3

FIG. 3 is a process flow 300 illustrating a method of providing offers at a consumer-operated device, such as client device 106, according to an embodiment. In the process flow 300, only client device 106 communicates with offer clearinghouse application 121 to redeem a digital coupon offer. Point of sale system 115 does not communicate with offer clearinghouse application 121.

Process 300 begins with client device 106 requesting a coupon offer from offer clearinghouse application 121, e.g. using shopper interface 153 (310). In some embodiments, optionally, the request for the coupon offer includes compensation provided to offer clearinghouse application 121 in order to obtain the coupon offer (315). Compensation may be in the form of electronic monetary payment, loyalty reward currency (i.e., dollars, points, frequent flyer miles, cellular telephone minutes, in-kind rewards, etc.), and so on.

In response to receiving the request from client device 106 for a coupon offer, offer clearinghouse application 121 issues a coupon offer (320). Offer clearinghouse application 121 also stores a code for at least one merchant/retailer at which the coupon offer can be redeemed (320). In some embodiments, the code is stored in data store 124. As an example, for a coupon offer for $1 off milk, offer clearinghouse application 121 may store multiple codes, each code corresponding to a respective store (such as retail stores, pharmacies, etc.) at which the coupon can be redeemed. As another example, for a coupon offer for $10 off dry-cleaning bill at a particular dry-cleaning store chain, offer clearinghouse application 121 may store multiple codes, a respective code corresponding to a respective store within the dry-cleaning store chain at which the coupon can be redeemed. As a third example, for a coupon offer for $10 off lunch bill at a particular restaurant, offer clearinghouse application 121 may store a single code corresponding to the restaurant at which the coupon can be redeemed. The code is not revealed to the client device 106.

Offer clearinghouse application 121 may further update a bookkeeping database, e.g., to decrement global offer limits associated with the issued coupon offer and may further update user database 131, e.g., to decrement user specific limits. Offer clearinghouse application 121 may further update a user record associated with client device 106 and/or the particular instance of application 145 on client device 106 in user database 131, e.g., to store the unique coupon identifier as active and issued to a specific user at a specific timestamp.

In some embodiments, optionally, offer clearinghouse application 121 issues a coupon offer (320) only in response to receiving compensation from client device 106 or a user or account associated therewith (325). As an example, in order to issue a coupon offer for $10 off lunch bill at a particular restaurant, offer clearinghouse application 121 may receive compensation of e.g., $5.

Client device 106 receives coupon offer information from offer clearinghouse application 121, e.g., via shopper interface 153 (330). Client device 106 may store the received coupon offer information on the client device 106, e.g., in memory associated with mobile application 145. In some embodiments, the received coupon offer information that is received by client device 106 may include a representation (e.g., a bar code) that uniquely identifies the digital coupon offer.

Subsequent to receiving and storing coupon offer information, client device 106 receives a code 116 presented by point of sale system 115 (335, 340), e.g., in response to client device 106 presenting the stored coupon offer information for redemption at point of sale system 115. In some embodiments, code 116 may include a QR code, and optionally, user of client device 106 uses a camera functionality or a scanning functionality associated with client device 106 to take a picture of or otherwise scan the QR code (345).

Client device 106, e.g., via mobile application 145, transmits information identifying the client device 106 and/or the particular instance of the mobile application 145 on client device 106 as well as code 116 to offer clearinghouse application 121 (350). In some embodiments, optionally, in addition to transmitting code 116, client device 106, e.g., via mobile application 145, also transmits at least a subset of the received coupon offer information (at 330). The subset of the received coupon offer information that is transmitted by client device 106 may e.g., include a representation that uniquely identifies the digital coupon offer. For example, subset of the received coupon offer information that is transmitted by client device 106 may include a unique bar code associated with the digital coupon offer. The user may have stored a plurality of digital coupon offers that can be redeemed at point of sale system 115, and may wish to (or be eligible to) redeem one or more particular offers of the stored plurality. In other embodiments, no information indicative of the one or more particular offers that the user wishes to (or be eligible to) redeem is transmitted to clearinghouse application 121. In some embodiments, optionally, in addition to transmitting code 116 (and optionally transmitting information indicative of the one or more particular offers that the user wishes to (or be eligible to) redeem) user provides compensation to clearinghouse application 121.

Offer clearinghouse application 121 receives information identifying the client device 106 and/or the particular instance of the mobile application 145 on client device 106 and identifies device 106 and/or particular instance of the mobile application 145 on client device 106 and/or user record associated therewith. Offer clearinghouse application 121 receives code 116 from client device 106 and determines if code 116 matches the merchant code associated with the digital coupon offer (360). If there is no match, offer clearinghouse application 121 may transmit an error message to the client device 106 (367). If there is a match with a digital coupon offer (e.g., the user record has a current and un-used digital coupon offer stored in it for the merchant identified by the received code), offer clearinghouse application 121 transmits an approval and/or further instructions for redeeming the coupon offer (365).

In one embodiment, the information received at the clearinghouse application 121 (at step 360) includes one or more of: an identifier that identifies the digital coupon, identification information for the products/services being purchased, and user information for the client device 106. The clearinghouse application 121 can use the information received at step 360 to determine whether a promotion associated with the digital coupon should be provided to the user in connection with the purchase by determining whether the products associated with the purchase qualify for the promotion, whether the digital coupon remains valid due to a campaign budget and/or an expiration date specified by a coupon specification, and/or whether the digital coupon remains valid due to its being used in excess of a number of uses specified by the coupon specification. Upon validating a digital coupon in this way, the clearinghouse application 121 can encumber the digital coupon associated with the user account (365). For example, for a coupon offer that can be redeemed twice, offer clearinghouse application 121 marks the coupon offer as having been used once.

Client device 106 receives approval and/or further instructions for redeeming the coupon offer and redeems the digital coupon offer based thereon at point of sale system 115 (370, 380). In one embodiment, the digital coupon can be transmitted to mobile application 145, which can display a bar code or provide another identifier associated with the digital coupon. A representation of the digital coupon can be generated by the shopper interface 153 such that it uniquely identifies the digital coupon and/or the user account with which the digital coupon is associated. Point of sale system 115 can receive a bar code or other identifier associated with the digital coupon.

Accordingly, point of sale system 115 can redeem the digital coupon offer with assurance that the coupon offer cannot be redeemed more than the number of times that it is authorized for. For e.g., for a coupon that can only be used once by a particular user, the merchant at point of sale system 115 can redeem the digital coupon offer with assurance that the digital coupon offer has been marked by the user as having been used at offer clearinghouse application 121. The same user would not be able to re-present the digital coupon offer at the point of sale system 115 of the same or another retailer.

In some embodiments, optionally, the coupon offer remains valid for a predetermined amount of time (375). After the validity term is over, in some embodiments, the coupon offer as stored on the user's mobile application 145 may expire. Thus, as an example, if the user presents the coupon offer at point of sale system 115 at 2:45 pm, the user may have, say 15 minutes to complete the transaction and redeem the coupon offer. This expiration term can act as a deterrent for the user to try to redeem the same coupon offer more than the number of times the user is authorized to redeem the coupon. As an example, if the coupon offer is limited to two redemptions, after the first redemption, the user may receive a limited window within which to present and redeem the coupon offer.

In some embodiments, optionally, in addition to presenting the stored coupon offer information, user provides compensation at the point of sale system 115 for redeeming the coupon offer (377). As an example, in order to redeem a coupon offer for $10 off lunch bill at a restaurant, user may provide compensation to the point of sale system 115 of $5.

In some embodiments, point of sale system 115 redeems the digital coupon offer only if compensation is received from client device 106 (385). As an example, in order to redeem a coupon offer for $10 off lunch bill, point of sale system 115 at a restaurant may receive compensation of e.g., $5.

FIG. 4

FIG. 4 is a process flow 400 illustrating a method of providing offers at a consumer-operated device, such as client device 106, according to an embodiment. In the process flow 400, only client device 106 communicates with offer clearinghouse application 121 to redeem a digital coupon offer. Point of sale system 115 does not communicate with offer clearinghouse application 121.

Process 400 begins with client device 106 requesting a coupon offer from offer clearinghouse application 121, e.g. using shopper interface 153 (410). In some embodiments, optionally, the request for the coupon offer includes compensation provided to offer clearinghouse application 121 in order to obtain the coupon offer (415). Compensation may be in the form of electronic monetary payment, loyalty reward currency (i.e., dollars, points, frequent flyer miles, cellular telephone minutes, in-kind rewards, etc.), and so on.

In response to receiving the request from client device 106 for a coupon offer, offer clearinghouse application 121 transmits an incomplete coupon offer to client device 106 (420). An incomplete coupon offer only contains a subset of the information of the complete coupon offer and cannot be redeemed without being completed. In some embodiments, the incomplete coupon offer may provide some details about the coupon offer terms and values, but does not describe the offer in sufficient detail to allow client 106 to display or render a coupon for the offer for redemption. In an embodiment, a unique coupon identifier that uniquely identifies the coupon offer is partially provided or not provided at all. In another embodiment, a complete coupon offer may be personalized and include identification information for the user, but an incomplete offer would be missing at least some user information. For example, a complete coupon offer might state: "$5 off dry-cleaning for Jack Smith of San Francisco, Calif." while an incomplete offer might state: "$5 off dry-cleaning for _____ of San Francisco, Calif." In another embodiment, a complete coupon offer includes all applicable coupon terms, but an incomplete offer would be missing at least some coupon terms. For example, a complete coupon offer might state: "$5 off dry-cleaning for Jack Smith of San Francisco, Calif." while an incomplete offer might state: "_____ off dry-cleaning for Jack Smith of San Francisco, Calif."

Offer clearinghouse application 121 may further update a bookkeeping database, e.g., to decrement global offer limits associated with the issued coupon offer and may further update user database 131, e.g., to decrement user specific limits. Offer clearinghouse application 121 may further update a user record associated with client device 106 and/or the particular instance of application 145 on client device 106 in user database 131, e.g., to store the unique coupon identifier as active and issued to a specific user at a specific timestamp.

Offer clearinghouse application 121 also stores a code for at least one merchant/retailer at which the coupon offer can be redeemed (420). As an example, for a coupon offer for $1 off milk, offer clearinghouse application 121 may store multiple codes, each code corresponding to a respective store (such as retail stores, pharmacies, etc.) at which the coupon can be redeemed. As another example, for a coupon offer for $10 off dry-cleaning bill at a particular dry-cleaning store chain, offer clearinghouse application 121 may store multiple codes, a respective code corresponding to a respective store within the dry-cleaning store chain at which the coupon can be redeemed. As a third example, for a coupon offer for $10 off lunch bill at a particular restaurant, offer clearinghouse application 121 may store a single code corresponding to the restaurant at which the coupon can be redeemed. The code is not revealed to the client device 106.

In some embodiments, optionally, offer clearinghouse application 121 issues an incomplete coupon offer (420) only in response to receiving compensation from client device 106 or a user or account associated therewith (425). As an example, in order to issue a coupon offer for $10 off lunch bill at a particular restaurant, offer clearinghouse application 121 may receive compensation of e.g., $5.

Client device 106 receives the incomplete coupon offer information from offer clearinghouse application 121, e.g., via shopper interface 153 (430). Client device 106 may store the received coupon offer information on the client device 106, e.g., in memory associated with mobile application 145. In some embodiments, the received coupon offer information that is received by client device 106 may include a partial representation (e.g., a bar code) that uniquely identifies the digital coupon offer.

Subsequent to receiving and storing the incomplete coupon offer information, client device 106 receives a code 116 presented by point of sale system 115 (435, 440), e.g., in response to client device 106 presenting the stored coupon offer information for redemption at point of sale system 115. In some embodiments, code 116 may include a QR code, and optionally, user of client device 106 uses a camera functionality or a scanning functionality associated with client device 106 to take a picture of or otherwise scan the QR code (445).

Client device 106, e.g., via mobile application 145, transmits code 116 to offer clearinghouse application 121 (450). In some embodiments, client device 106, e.g., via mobile application 145, transmits information identifying the client device 106 and/or the particular instance of the mobile application 145 on client device 106 as well as code 116 to offer clearinghouse application 121 (450). In some embodiments, optionally, in addition to transmitting code 116, client device 106, e.g., via mobile application 145, also transmits at least a subset of the coupon offer information received at 330. The subset of the received coupon offer information that is transmitted by client device 106 may e.g., include a representation that uniquely identifies the digital coupon offer. For example, subset of the received coupon offer information that is transmitted by client device 106 may include a unique bar code associated with the digital coupon offer. The user may have stored a plurality of digital coupon offers that can be redeemed at point of sale system 115, and may wish to (or be eligible to) redeem one or more particular offers of the stored plurality. In other embodiments, no information indicative of the one or more particular offers that the user wishes to (or be eligible to) redeem is transmitted to clearinghouse application 121. In some embodiments, optionally, in addition to transmitting code 116 (and optionally transmitting information indicative of the one or more particular offers that the user wishes to (or be eligible to) redeem) user provides compensation to clearinghouse application 121.

Offer clearinghouse application 121 receives information identifying the client device 106 and/or the particular instance of the mobile application 145 on client device 106 and identifies device 106 and/or particular instance of the mobile application 145 on client device 106 and/or user record associated therewith. Offer clearinghouse application 121 receives code 116 from client device 106 and determines if code 116 matches the merchant code associated with the digital coupon offer (460). If there is no match, offer clearinghouse application 121 may transmit an error message to the client device 106 (467). If there is a match with a digital coupon offer (e.g., the user record has a current and un-used digital coupon offer stored in it for the merchant identified by the received code), offer clearinghouse application 121 transmits a complete coupon offer and/or further instructions for redeeming the coupon offer (465). The complete coupon offer includes all the information necessary for redemption of the coupon offer.

In one embodiment, the information received at the clearinghouse application 121 (at step 460) includes one or more of: an identifier that identifies the digital coupon, identification information for the products/services being purchased, and user information for the client device 106. The clearinghouse application 121 can use the information received at step 460 to determine whether a promotion associated with the digital coupon should be provided to the user in connection with the purchase by determining whether the products associated with the purchase qualify for the promotion, whether the digital coupon remains valid due to a campaign budget and/or an expiration date specified by a coupon specification, and/or whether the digital coupon remains valid due to its being used in excess of a number of uses specified by the coupon specification. Upon validating a digital coupon in this way, the clearinghouse application 121 can encumber the digital coupon associated with the user account (465). For example, for a coupon offer that can be redeemed twice, offer clearinghouse application 121 marks the coupon offer as having been used once.

Client device 106 receives the complete coupon offer and/or further instructions for redeeming the coupon offer and redeems the digital coupon offer based thereon at point of sale system 115 (470, 480). The merchant at point of sale system 115 can redeem the digital coupon offer with assurance that the coupon offer cannot be redeemed more than the number of times that it is authorized for. For e.g., for a coupon that can only be used once by a particular user, the merchant at point of sale system 115 can redeem the digital coupon offer with assurance that the digital coupon offer has not been redeemed before. If the offer had been marked as used or expired, the offer clearinghouse application 121 would not have transmitted the complete offer details to client device 106. The same user would not be able to re-present the digital coupon offer at the point of sale system 115 of the same or another retailer.

In some embodiments, optionally, the complete coupon offer remains valid for a predetermined amount of time (475). After the validity term is over, in some embodiments, the coupon offer as stored on the user's mobile application 145 may expire. Thus, as an example, if the user presents the coupon offer at point of sale system 115 at 2:45 pm, the user may have, say 15 minutes to complete the transaction and redeem the coupon offer. This expiration term can act as a deterrent for the user to try to redeem the same coupon offer more than the number of times the user is authorized to redeem the coupon.

In some embodiments, optionally, in addition to presenting the stored coupon offer information, user provides compensation at the point of sale system 115 for redeeming the coupon offer (477). As an example, in order to redeem a coupon offer for $10 off lunch bill at a restaurant, user may provide compensation to the point of sale system 115 of $5. In some embodiments, point of sale system 115 redeems the digital coupon offer only if compensation is received from client device 106 (485). As an example, in order to redeem a coupon offer for $10 off lunch bill, point of sale system 115 at a restaurant may receive compensation of e.g., $5.

FIG. 5

Figure 5:
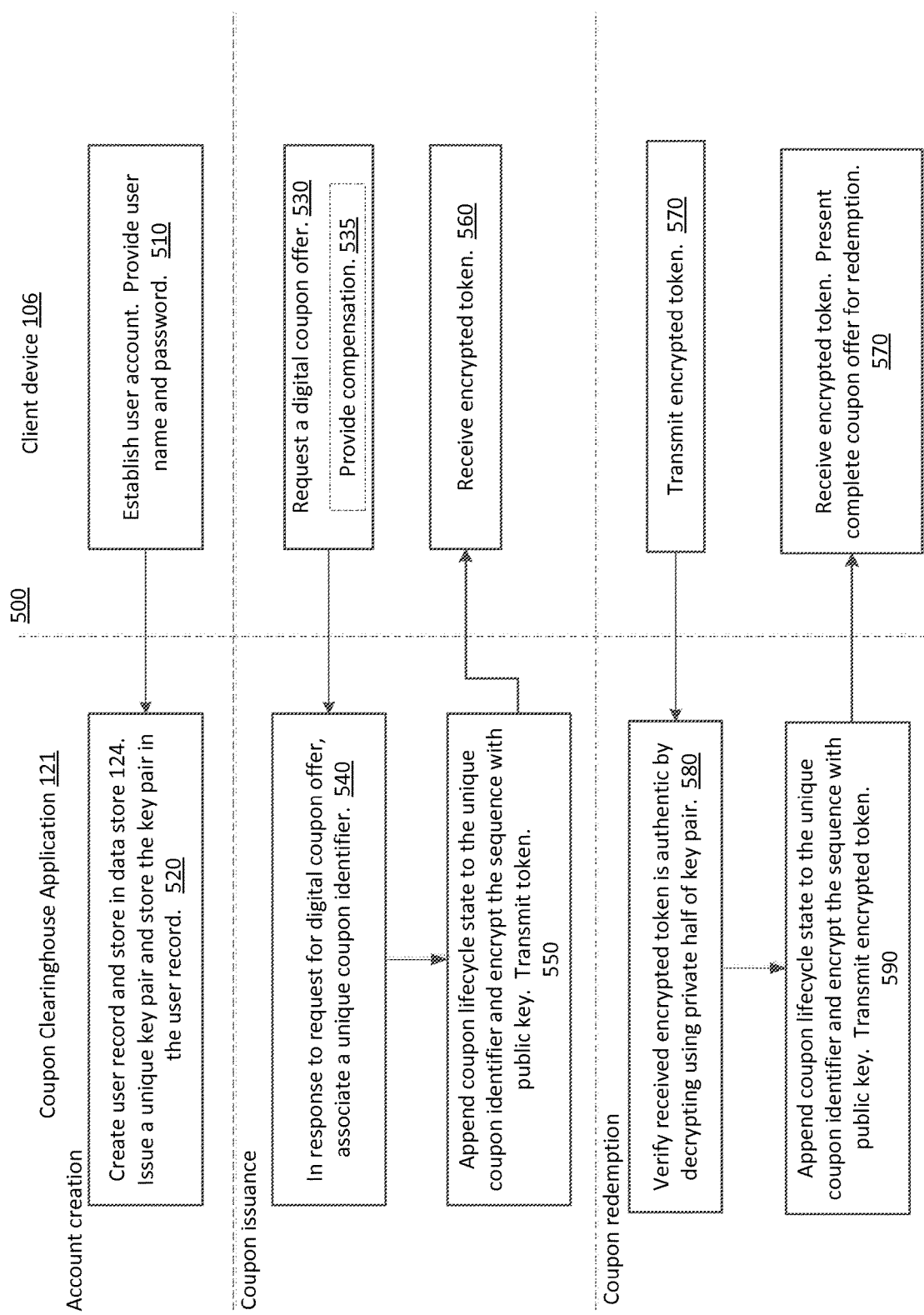
FIG. 5 is a process flow illustrating an embodiment of a method of providing offers at a consumer-operated device.

FIG. 5 is a process flow 500 illustrating a method of account creation, coupon issuance and redemption according to an embodiment. In process 500, dual-key cryptography is applied to tokens exchanged between coupon clearinghouse application and client device 106 for high security, such as may be necessary when issuing high-value coupons (e.g., $10 off $20 purchase).

Process 500 begins with a user associated with client device 106 requesting to establish a user account with e.g., shopper interface 153 of offer clearinghouse application 121. User may provide a user name/login and/or password or other types of authentication information, such as multi-factor authentication, login/password combinations associated with an email account, a social networking site account, and so on (510).

In response to user requesting a user account, offer clearinghouse application 121 creates a user record that can be stored in user database 131 (520). User database 131 is discussed further with reference to FIG. 7. Clearinghouse application 121 stores in the user record user identifying information, such as user provided user name, login, password, authentication information, etc. In addition, clearinghouse application 121 stores in the user record a public-private key pair that is unique to the user record such that the key pair is linked to the end user entity. The key pair is used as an additional level of trust to both protect and verify coupons issued specifically to a particular registered user, as discussed further. Unlike in traditional key pair cryptography, the public key is not shared with client device 106. Rather, both keys are stored in user database 531. The Clearinghouse application 121 may optionally provide confirmation to client device 106 that a user account was successfully created.

After registration or at any subsequent successful logins, client device 106 may request a digital coupon offer from offer clearinghouse application 121, e.g. using shopper interface 153 (530). In some embodiments, optionally, the request for the coupon offer includes compensation provided to offer clearinghouse application 121 in order to obtain the coupon offer (535). Compensation may be in the form of electronic monetary payment, loyalty reward currency (i.e., dollars, points, frequent flyer miles, cellular telephone minutes, in-kind rewards, etc.), and so on.

In response to receiving the request from client device 106 for a digital coupon offer, offer clearinghouse application 121 releases a unique coupon identifier for the requested coupon 106 (540). In some embodiments, offer clearinghouse application 121 releases the unique coupon identifier only if certain eligibility criteria are met. For example, offer clearinghouse application 121 may check the user record to ascertain that the user has not surpassed coupon redemption limits. As another example, offer clearinghouse application 121 may check the user record to ascertain that a geographic region (e.g., zip code) associated with the user renders the user eligible to redeem the requested coupon offer. As another example, offer clearinghouse application 121 may release the unique coupon identifier only in response to receiving compensation from client device 106 or a user or account associated therewith. As an example, in order to release a coupon offer for $10 off lunch bill at a particular restaurant, offer clearinghouse application 121 may receive compensation of e.g., $5.

Offer clearinghouse application 121 appends an initial coupon lifecycle state (e.g., "issued") to the unique coupon identifier and encrypts the sequence (unique coupon identifier appended with the state information) with the public key associated with the user record for client device 106 (545). Offer clearinghouse application 121 transmits the encrypted token to client device 106. Offer clearinghouse application 121 may further update a bookkeeping database, e.g., to decrement global offer limits associated with the issued coupon offer and may further update user database 131, e.g., to decrement user specific limits. Offer clearinghouse application 121 may further update a user record associated with client device 106 and/or the particular instance of application 145 on client device 106 in user database 131, e.g., to store the unique coupon identifier as active and issued to a specific user at a specific timestamp.

Client device 106 receives the token from offer clearinghouse application 121, e.g., via shopper interface 153 (560). Client device 106 may store the received token on the client device 106, e.g., in memory associated with mobile application 145.

Steps 570-590 describe the steps required to redeem the digital coupon offer (e.g., redeem at a point of sale system 115, add to a shopping list, add to a digital wallet, etc.) for which the token was received at 560. The redemption begins with a registered and authenticated client device 106 transmitting token received at 560 to offer clearinghouse application 121.

Offer clearinghouse application 121 verifies the authenticity of the received token and checks to see if the received token is consistent with the one stored in the user database (580). In order to check if the received token is authentic, offer clearinghouse application 121 uses the private key to decrypt the token. Upon decryption, offer clearinghouse application 121 checks to ensure that the state of the token is consistent with the one stored in the database. At this stage, the token state should be "issued."

Offer clearinghouse application 121 may further verify that business rules are followed. For instance, offer clearinghouse application 121 may check to see that the token is still valid, if the associated offer has ended, if the associated offer is within a blackout period, if a redemption limit has been reached, and so on.

Upon verification, offer clearinghouse application 121 accesses the stored unencrypted unique coupon identifier and appends an updated coupon lifecycle state (e.g., indicating request for redemption) to the unique coupon identifier and encrypts the sequence (unique coupon identifier appended with the state information) with the public key associated with the user record for client device 106 (590). Offer clearinghouse application 121 transmits the encrypted token to client device 106. Offer clearinghouse application 121 may further update a bookkeeping database, e.g., to decrement global offer and user specific limits, as well as to update the stored unique coupon identifier with the updated coupon lifecycle state (e.g., indicating request for redemption) with an optional timestamp.

Client device 106 receives the encrypted token and the public key for redeeming the coupon offer and redeems the digital coupon offer, e.g., at point of sale system 115 (570).

FIG. 6

Figure 6:
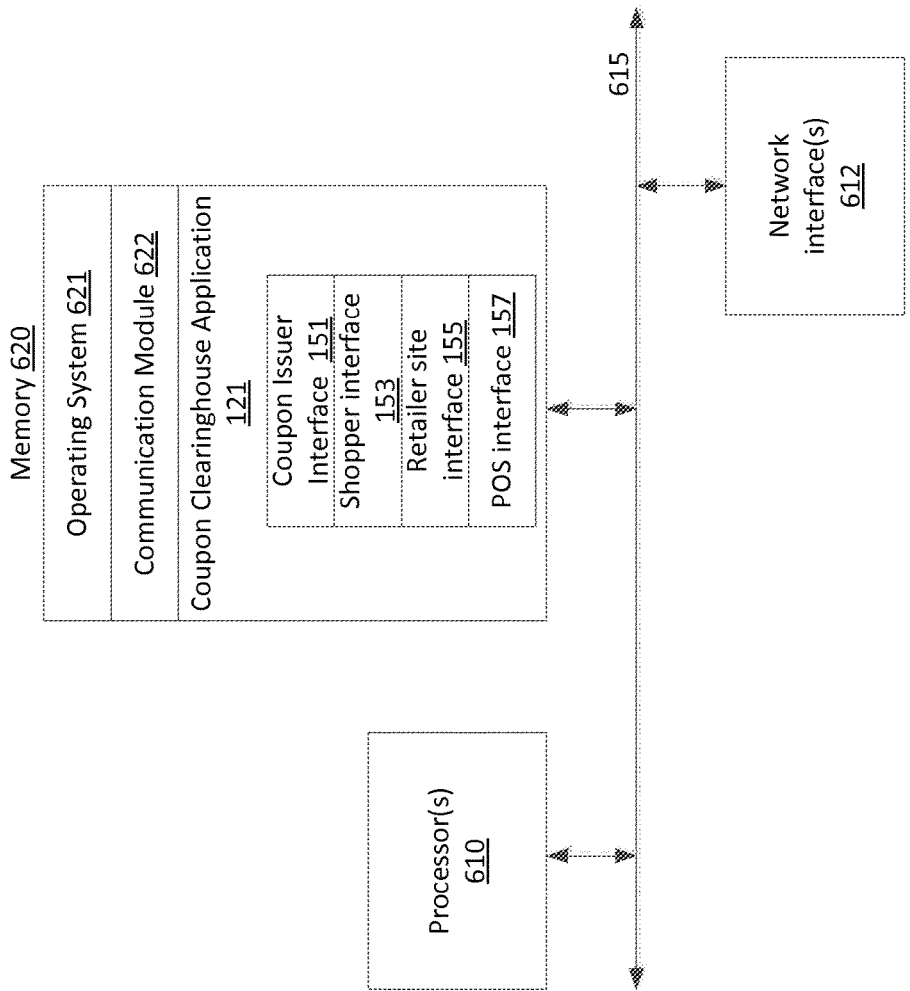
FIG. 6 is a block diagram of a coupon clearinghouse system according to various embodiments of the present disclosure.

FIG. 6 is a block diagram illustrating clearinghouse system 103, according to some embodiments. System 103 typically includes one or more single- or multi-core processing units ("CPU" or "CPUs") 610 as well as one or more network or other communications interfaces 612, respectively. System 103 includes memory 620 and one or more communication buses 615, respectively, for interconnecting these components. The communication buses 615 may include circuitry (sometimes called a chipset) that interconnects and controls communications between system components (not depicted herein).

Memory 620 may include high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 620 may optionally include one or more storage devices remotely located from the CPU(s) 610. Memory 620, or alternately the non-volatile memory device(s) within memory 620, comprise a computer readable storage medium.

In some embodiments, memory 620 stores the following programs, modules and data structures, or a subset thereof: an operating system 621 that includes procedures for handling various basic system services and for performing hardware dependent tasks; a communication module 622 that is used for connecting system 103, respectively, to other devices via their one or more respective communication interfaces 612 (wired or wireless) and one or more communication networks, such as the Internet, other wide area networks, local area networks, metropolitan area networks, and so on; offer clearinghouse application 121 and so on.

Each of the above identified elements may be stored in one or more of the previously mentioned memory devices, and correspond to a set of instructions for performing functions described herein. The set of instructions can be executed by one or more processors (e.g., the one or more CPUs 610). The above identified modules or programs (i.e., sets of instructions) need not be implemented as separate software programs, procedures or modules, and thus various subsets of these modules may be combined or otherwise rearranged in various embodiments. In some embodiments, memory 620 may store a subset of the modules and data structures identified above. Furthermore, memory 620 may store additional modules and data structures not described above.

Figure 7:
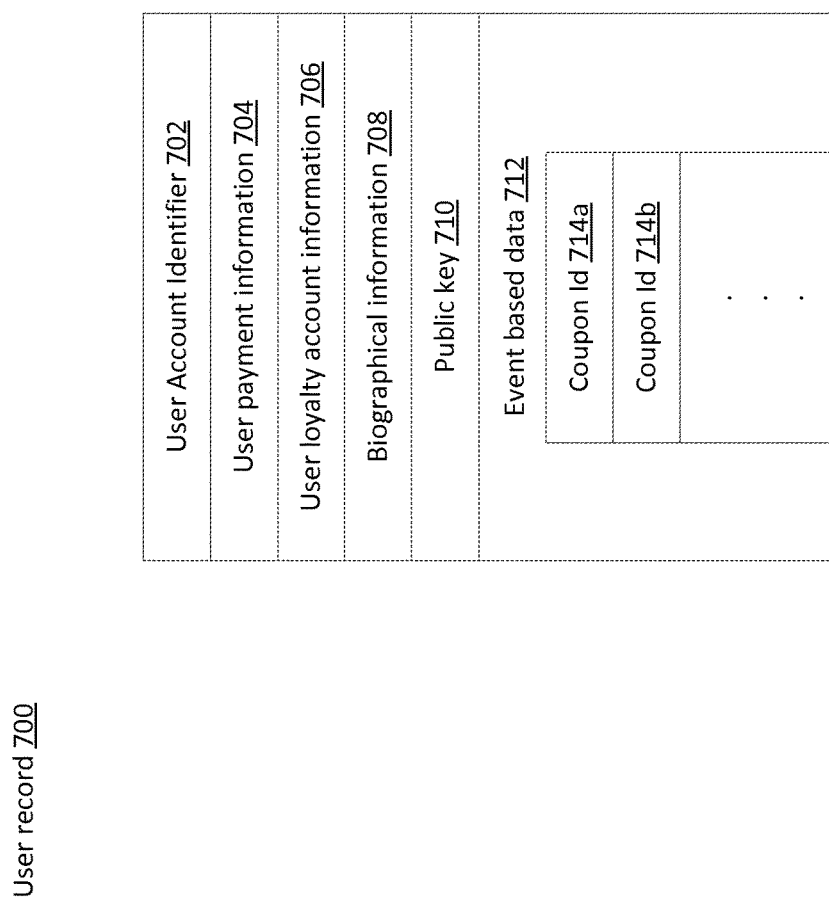
FIG. 7 is a block diagram of a database structure for storing user account data in accordance with certain embodiments of the present invention.

FIG. 7 is an exemplary user record 700 in user information database 131 (FIG. 1) in accordance with one embodiment of the invention. In some embodiments, user record 700 contains a subset or a superset of the elements depicted in FIG. 7. A respective user account record 700 may include such information as: (i) one or more user account identifiers 702 which associates certain information in user information database 131 to a particular user or user identifier (e.g., user's login user name and password associated with a social networking site, user's email login user name and password, user's account user name and password associated with an online merchant, etc.) and/or to a particular instance of a client application 145 and/or client device 106, (ii) payment information 704 of the user, such as credit card information, bank information, or other financial information which may be used to facilitate online transactions by user, (iii) user loyalty account information 706, such as user's loyalty card number and account information associated with one or more retailers (iv) user biographical and geographical information 708, such as may be used to provide the user with targeted coupon offers and/or to determine user eligibility for clipping and/or redeeming coupon offers, (v) a public-private key pair 710 (as discussed with reference to FIG. 5), and (vi) event-based data 712 (e.g., data derived from monitoring a user's queries, click results, coupon clicks, digital coupons clipped, coupons redeemed, etc.), and so on. In an embodiment, the digital coupons with which the account identifier 702 is associated are unique instances of corresponding offers, wherein each unique instance has a unique coupon identifier. Accordingly, event-based data 712 may store unique coupon information 714a-714b for digital coupons associated with the user record 700. Coupon information 714 may include coupon identifier (e.g, a unique number that uniquely identifies the coupon), the coupon state (e.g, active, redeemed, expired, etc.), coupon terms, etc.

Account identifier 702 is a series of characters and/or symbols that uniquely identifies a consumer or a consumer account associated with the consumer. In an embodiment, account identifier 702 is a number for a card account, such as a credit card account or consumer loyalty card account. In an embodiment, account identifier 702 is a unique device identifier belonging to a portable computing device. Examples include a mobile phone, laptop or netbook computer, tablet computer, personal digital assistant, flash drive, music player, or camera. For example, the device identifier may be a MAC address, Bluetooth address, serial number, randomly assigned number, and so forth. In an embodiment, identifier 702 does not necessarily correspond to device hardware, but may rather be provided by a software application executing on the device. In an embodiment, account identifier 702 may be associated with biometric data that uniquely identifies consumer, such as a fingerprint or a retinal scan.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
    receiving, by a coupon clearinghouse server, a request for a digital coupon offer from a client device;
    in response to receiving the request, issuing, by the coupon clearinghouse server, the digital coupon offer to the client device;
    in response to receiving the request, storing, by the coupon clearinghouse server in memory, a first code for a first merchant at which the digital coupon offer is redeemable;
    subsequent to issuing the digital coupon offer and storing the first code, receiving, by the coupon clearinghouse server from the client device, a second code, wherein the second code is provided to the client device at a point of sale system in response to the client device presenting the digital coupon offer at the point of sale system;
    determining, by the coupon clearinghouse server and without the coupon clearinghouse server communicating with the point of sale system, if there is a match between the first code and the second code; and
    in response to determining a match between the first code and the second code, the coupon clearinghouse server:
        transmitting digital coupon offer redemption instructions to the client device, wherein the instructions include a representation of the digital coupon that is presented by the client device to the point of sale system to redeem the digital coupon, and
        encumbering the digital coupon offer;
    wherein in the coupon clearinghouse server performing the method, the coupon clearinghouse server communicates only with the client device.

2. The method of claim 1, further comprising:
    in addition to receiving the request for the digital coupon offer from the client device, receiving compensation for the digital coupon offer from an account associated with the client device.

3. The method of claim 1, further comprising: in response to determining a lack of a match between the first code and the second code, transmitting an error message to the client device.

4. The method of claim 1, wherein the digital coupon offer redemption instructions are valid for a predetermined amount of time.

5. The method of claim 1, wherein the second code is obtained by the client device by scanning a QR code available at the point of sale system.

6. A method comprising:
    receiving, by a coupon clearinghouse server, a request for a coupon offer from a client device, wherein the coupon offer includes a first subset of digital coupon offer data and a second subset of digital coupon offer data;
    in response to receiving the request, transmitting, by the coupon clearinghouse server, the first subset of digital coupon offer data for the coupon offer to the client device;
    in response to receiving the request, storing, by the coupon clearinghouse server in memory, a first code for a first merchant at which the coupon offer is redeemable;
    subsequent to transmitting the first subset of digital coupon offer data and storing the first code, receiving, by the coupon clearinghouse server from the client device, a second code, wherein the second code is provided to the client device at a point of sale system in response to the client device presenting the first subset of digital coupon offer data at the point of sale system;

determining, by the coupon clearinghouse server and without the coupon clearinghouse server communicating with the point of sale system, if there is a match between the first code and the second code; and in response to determining a match between the first code and the second code, the coupon clearinghouse server:
- transmitting the second subset of digital coupon offer data including coupon offer redemption instructions to the client device, wherein the instructions include a representation of a digital coupon that is presented by the client device to the point of sale system to redeem the coupon offer, and
- encumbering the coupon offer;

wherein in the coupon clearinghouse server performing the method, the coupon clearinghouse server communicates only with the client device.

7. The method of claim 6, further comprising:
in addition to receiving the request for the coupon offer from the client device, receiving compensation for the coupon offer from an account associated with the client device.

8. The method of claim 6, further comprising: in response to determining a lack of a match between the first code and the second code, transmitting an error message to the client device.

9. The method of claim 6, wherein the coupon offer redemption instructions are valid for a predetermined amount of time.

10. The method of claim 6, wherein the second code is obtained by the client device by scanning a QR code available at the point of sale system.

11. One or more non-transitory computer-readable media storing instructions, which when executed by one or more processors of a coupon clearinghouse server, cause the one or more processors to perform functions including:
receiving a request for a digital coupon offer from a client device;

in response to receiving the request, issuing the digital coupon offer to the client device;

in response to receiving the request, storing, in memory, a first code for a first merchant at which the digital coupon offer is redeemable;

receiving, from the client device, a second code, wherein the second code is provided to the client device at a point of sale system in response to the client device presenting the digital coupon offer at the point of sale system;

determining, by the one or more processors of the coupon clearinghouse server and without the one or more processors of the coupon clearinghouse server communicating with the point of sale system, if there is a match between the first code and the second code; and in response to determining a match between the first code and the second code: transmitting digital coupon offer redemption instructions to the client device, wherein the instructions include a representation of the digital coupon that is presented by the client device to the point of sale system to redeem the digital coupon offer; and encumbering the digital coupon offer;

wherein in the one or more processors of the coupon clearinghouse server performing the functions, the coupon clearinghouse server communicates only the client device.

12. The one or more non-transitory computer-readable media of claim 11 storing instructions, which when executed by the one or more processors of the coupon clearinghouse server, cause the one or more processors to perform functions including:
in addition to receiving the request for the digital coupon offer from the client device, receiving compensation for the digital coupon offer from an account associated with the client device.

13. The one or more non-transitory computer-readable media of claim 11 storing instructions, which when executed by the one or more processors of the coupon clearinghouse server, cause the one or more processors to perform functions including:
in response to determining a lack of a match between the first code and the second code, transmitting an error message to the client device.

14. The one or more non-transitory computer-readable media of claim 11, wherein the digital coupon offer redemption instructions are valid for a predetermined amount of time.

15. The one or more non-transitory computer-readable media of claim 11, wherein the second code is from a scan of a QR code at the point of sale system.

16. The one or more non-transitory computer-readable media of claim 11, wherein the digital coupon offer redemption instructions include a digital coupon representing the digital coupon offer.

17. The method of claim 1, wherein the coupon clearinghouse server transmitting digital coupon offer redemption instructions to the client device includes the coupon clearinghouse server transmitting, to the client device, a digital coupon representing the digital coupon offer.

18. The method of claim 6, wherein the coupon clearinghouse server transmitting coupon offer redemption instructions to the client device includes the coupon clearinghouse server transmitting, to the client device, a digital coupon representing the coupon offer.

* * * * *